(12) United States Patent
Miller, II

(10) Patent No.: US 11,027,935 B2
(45) Date of Patent: Jun. 8, 2021

(54) PAYOUT OF FILM AT COMPOSITE FABRICATION SYSTEMS

(71) Applicant: The Boeing Company, Chicago, IL (US)

(72) Inventor: Richard Allen Miller, II, Seattle, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 16/013,251

(22) Filed: Jun. 20, 2018

(65) Prior Publication Data

US 2019/0389681 A1    Dec. 26, 2019

(51) Int. Cl.
| | |
|---|---|
| *B65H 16/00* | (2006.01) |
| *B65H 16/06* | (2006.01) |
| *B65H 35/06* | (2006.01) |
| *B65H 35/00* | (2006.01) |
| *B65H 35/02* | (2006.01) |
| *B64F 5/10* | (2017.01) |
| *B29C 70/30* | (2006.01) |

(52) U.S. Cl.
CPC .......... *B65H 16/005* (2013.01); *B65H 16/06* (2013.01); *B65H 35/002* (2013.01); *B65H 35/0086* (2013.01); *B65H 35/02* (2013.01); *B65H 35/06* (2013.01); *B29C 70/30* (2013.01); *B64F 5/10* (2017.01)

(58) Field of Classification Search
CPC .... B65H 16/00; B65H 16/005; B65H 16/106; B65H 45/103; B65H 29/46; B65H 20/00; B65H 20/10; B65H 35/04; B65H 35/06
See application file for complete search history.

(56) References Cited

U.S. PATENT DOCUMENTS

| | | | | |
|---|---|---|---|---|
| 3,270,290 A | * | 8/1966 | Maurer | C03C 3/095 372/40 |
| 3,503,605 A | * | 3/1970 | Stumpf | B65H 45/103 270/30.11 |
| 4,355,794 A | * | 10/1982 | Costigan | B65H 45/103 270/30.09 |

(Continued)

FOREIGN PATENT DOCUMENTS

| | | | | |
|---|---|---|---|---|
| DE | 3145026 A1 | * | 5/1983 | ........... B65H 45/103 |
| DE | 3218483 A1 | * | 11/1983 | ............... D06H 7/02 |

OTHER PUBLICATIONS

English Translation of DE3218483. (Year: 1983).*

(Continued)

*Primary Examiner* — Jennifer B Swinney
(74) *Attorney, Agent, or Firm* — Brett Bornsen

(57) ABSTRACT

Systems and methods are provided for paying out material. One embodiment is a method for dispensing film onto a surface. the method includes operating vacuum ports at a suction table, adhering a leading edge of a web of film to the suction table, driving the payout system across the suction table while the vacuum ports are being operated and while unrolling the web of film, unrolling a web of film from a roll of a payout system that is mounted for traversal across the upper surface of the suction table, and enforcing tension at the web of film between the suction table and the roll while payout system is drawn across the suction table.

27 Claims, 17 Drawing Sheets

(56) References Cited

U.S. PATENT DOCUMENTS

| | | | | | |
|---|---|---|---|---|---|
| 4,392,646 | A | * | 7/1983 | Costigan | B65H 45/103 |
| | | | | | 270/30.05 |
| 4,494,740 | A | * | 1/1985 | Noboru | B65H 45/103 |
| | | | | | 26/90 |
| 4,527,346 | A | * | 7/1985 | Schwartzott | A41H 43/005 |
| | | | | | 112/DIG. 2 |
| 4,589,644 | A | * | 5/1986 | Gratsch | B65H 45/103 |
| | | | | | 270/30.03 |
| 2015/0013514 | A1 | * | 1/2015 | Strauss | B26D 1/045 |
| | | | | | 83/29 |

OTHER PUBLICATIONS

Horizontal Paper Cutter-24; ULINE Products: https://www.uline.com; Jun. 5, 2018.
Safety Tape Dispenser with Retractable Blade-2; ULINE Products: https://www.uline.com; May 4, 2018.

* cited by examiner

# PAYOUT OF FILM AT COMPOSITE FABRICATION SYSTEMS

FIELD

The disclosure relates to the field of fabrication, and in particular, to fabrication of composite parts.

BACKGROUND

Laminates (i.e., uncured composite parts) that are particularly large may be transferred from a layup tool to a forming tool (e.g., a mandrel) as part of the fabrication process. To facilitate the transfer process, a transfer film is placed onto the layup tool before the laminate is laid-up. The laminate is then laid-up onto the transfer film that rests atop the layup tool. The entire transfer film, including the laminate, may then be moved from a layup tool to a forming tool. If the transfer film includes any perturbations or wrinkles, these features may undesirably mark the laminate. Marks out of design tolerance are not desired.

Therefore, it would be desirable to have a method and apparatus that take into account at least some of the issues discussed above, as well as other possible issues.

SUMMARY

Embodiments described herein facilitate the seamless application of a transfer film to a suction table that operates as a layup tool. The systems described herein include a mobile payout system comprising a roll of transfer film. The payout system may be translated across the surface of a suction table while the suction table is operating. This ensures that a web of material exiting the roll is constantly in tension between the roll and vacuum ports at the suction table. This tension prevents wrinkle formation in the transfer film, and enhances the quality of laminates (as well as their resulting composite parts).

One embodiment is a method for dispensing film onto a surface. the method includes operating vacuum ports at a suction table, adhering a leading edge of a web of film to the suction table, driving the payout system across the suction table while the vacuum ports are being operated and while unrolling the web of film, unrolling a web of film from a roll of a payout system that is mounted for traversal across the upper surface of the suction table, and enforcing tension at the web of film between the suction table and the roll while payout system is drawn across the suction table.

A further embodiment is a method for aligning a cart with a table. The method includes vertically aligning an upper frame of a cart with at least one surface of a suction table, indexing the payout system to the suction table, rolling a payout system from the cart onto the suction table, driving the payout system across the suction table while continuously paying out a web of film from the payout system onto an upper surface of the suction table, and adhering the web of film to the upper surface as the payout system is being driven.

Yet another embodiment is a system for dispensing film onto a table. The system includes a suction table. The suction table includes an upper surface and vacuum ports which draw air from the upper surface. The system also includes a payout system comprising a spool configured to dispense film from a roll, as well as frame elements that are disposed at sides of the spool and are separated by at least a width of the upper surface and provide mechanical integrity for the payout system, linear elements that structurally unite the frame elements together, and wheels that are configured to roll the payout system along at least one surface of the suction table while the roll dispenses film.

Still another embodiment is a method for forming a composite part. The method includes tensionally dispensing a film onto a suction table from a payout device, adhering the film to the suction table, and placing a preform upon the film.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together form a laminate. Individual fibers within each layer of the laminate are aligned parallel with each other, but different layers may exhibit different fiber orientations in order to increase the strength of the resulting composite along different dimensions. The laminate may include a resin that solidifies in order to harden the laminate into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to liquid form if it is re-heated. Payout system 120 of FIG. 1, discussed below, may dispense material that facilitates the layup and transfer of laminates and/or composite parts.

Figure 1:
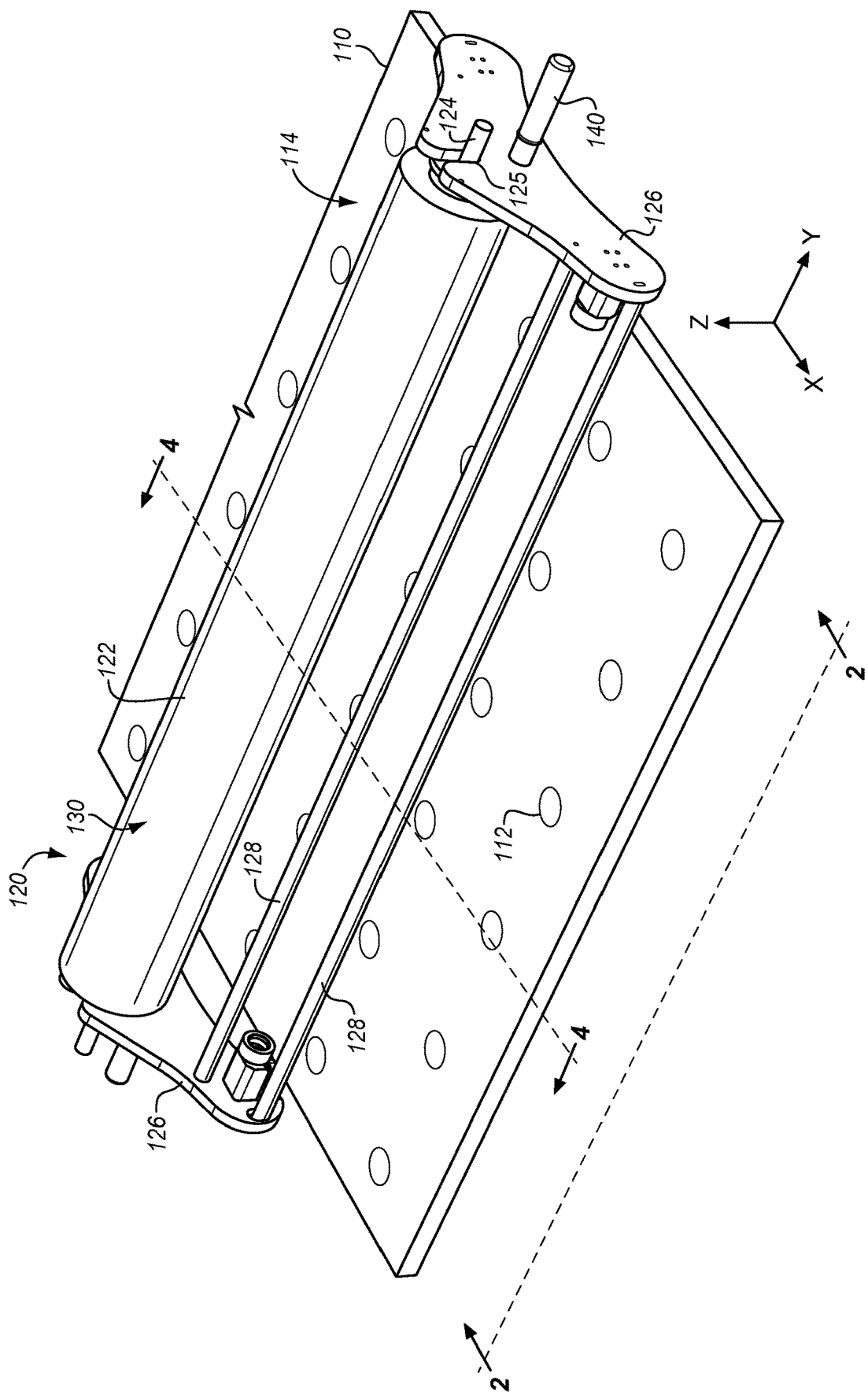
FIG. 1 is a perspective view of a payout system set atop a suction table in an illustrative embodiment.

FIG. 1 is a perspective view of a payout system 120 set atop a suction table 110 in an illustrative embodiment. Payout system 120 comprises any system or device operable to traverse suction table 110 while continuously dispensing a film 130 (e.g., a polyester film) from a roll 122 onto an upper surface 114 of the suction table. Roll 122 is mounted to spool 124, which rotates within mounts 125 of frame elements 126. Frame elements 126 are physically attached to each other via linear elements 128, and provide mechanical support and integrity to payout system 120. In addition to upper surface 114, suction table 110 also include vacuum ports 112. Vacuum ports 112 pull air from upper surface 114, and therefore secure the film 130 in place as the film 130 is dispensed. Roll 122 may for example extend for five feet along the Y direction, and upper surface 114 may for example extend for fifty inches in the Y direction and for a hundred feet on more in the X direction. Thus, roll 122 may overhang or otherwise extend beyond upper surface 114 along the Y direction.

A technician may operate payout system 120 by pushing handles 140 to roll payout system 120 along the positive or negative X direction. As shown in FIG. 1, payout system 120 may be dimensioned to provide sufficient rigidity for use by a single operator. For example, a ratio of width (along the Y direction) to length (along the X direction) of payout system 120 may be between two to one and four to one (e.g., three to one), and payout system 120 may be approximately five feet wide.

Figure 2:
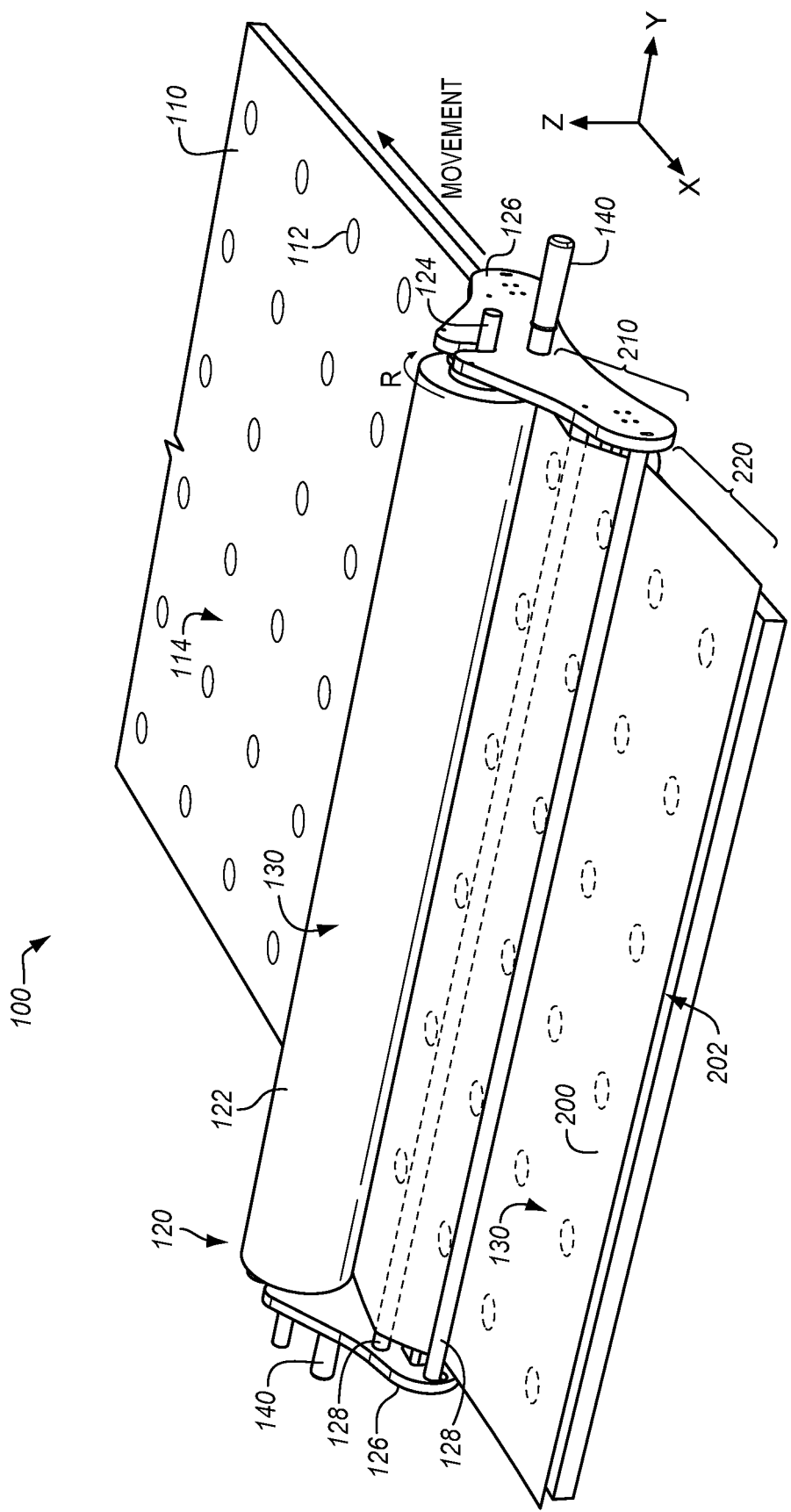
FIG. 2 is a perspective view of a payout system dispensing a web of film onto a suction table in an illustrative embodiment.

FIG. 2 is a perspective view of a payout system 120 dispensing a web 200 of film onto a suction table 100 in an illustrative embodiment. Specifically, FIG. 2 corresponds with view arrows 2 of FIG. 1. According to FIG. 2, payout system 120 travels along the direction indicated by the arrow labeled "movement." As payout system 120 proceeds, roll 122 rotates in direction R, which dispenses web 200. Web 200 is threaded between linear elements 128, which may comprise rollers that tension the web 200. Web 200 is drawn by vacuum ports 112 onto upper surface 114 of suction table 110. Web 200 includes a routed portion 210 which is threaded through linear elements 128, as well as a planar portion 220 which is in contact with upper surface 114. Tension between roll 122 and planar portion 220 of web (which is held in place by vacuum ports 112) prevents wrinkle formation from occurring as film 130 is dispensed. Leading edge 202 of web 200 is also illustrated.

Illustrative details of the operation of payout system 120 will be discussed with regard to FIG. 3. Assume, for this embodiment, that payout system 120 rests atop suction table 110 and has been loaded with a roll 122 of film 130. Further, assume that an end of web 200 of the film 130 is ready to be taped to suction table 110 (e.g., prior to drawing the payout system 120 across suction table 110). This step may be foregone if desired, or may be performed in order to provide mechanical stability and fixation of film 130 during the initial stages of dispensing. The tape may then be removed, or left in place after suction is applied by suction table 110.

Figure 3:
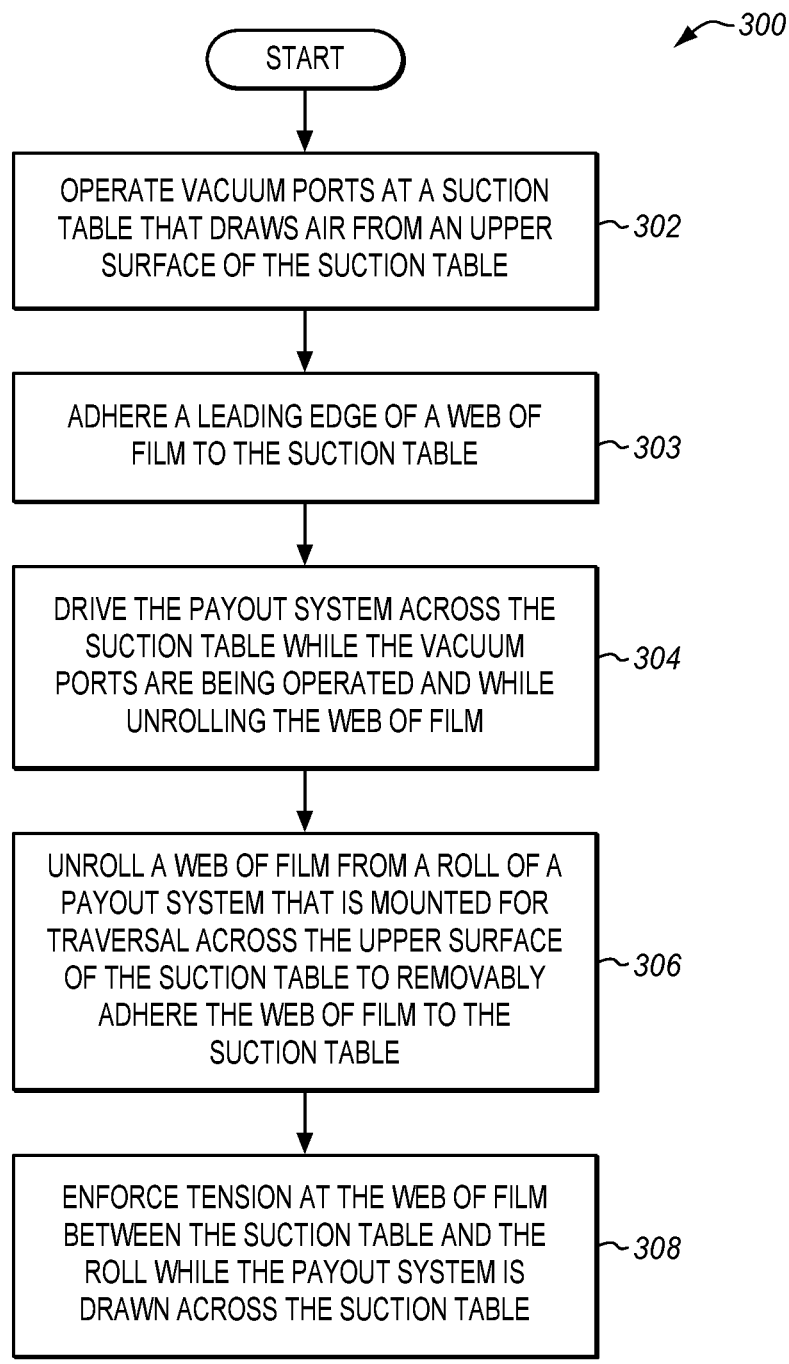
FIG. 3 is a flowchart illustrating a method for dispensing a web of film from a payout system onto a suction table in an illustrative embodiment.

FIG. 3 is a flowchart illustrating a method for dispensing a web of film from a payout system onto a suction table in an illustrative embodiment. The steps of method 300 are described with reference to payout system 120 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, suction table 110 operates vacuum ports 112, which draw air from upper surface 114. The vacuum ports may apply, for example, twenty-one inches of mercury of pressure across upper surface 114. With vacuum ports 112 in operation, newly dispensed film 130 from roll 122 will adhere to upper surface 114 as the film 130 is dispensed. In step 303, a leading edge 202 of web 200 is adhered/secured to suction table 110 (e.g., via vacuum or via a piece of tape).

Payout system 120 is driven across suction table 110 while unrolling the web 200 and while vacuum ports 112 are being operated (step 304). This results in step 306, wherein web 200 of film 130 is unrolled from roll 122 of payout system 120, which itself is mounted for traversal across upper surface 114 of suction table 110. This removably adheres web 200 to suction table 110. The adherence is highly beneficial because it prevents wrinkles from forming during and after film 130 has been dispensed, even during layup processes for composite parts. This in turn provides enhanced quality of composite parts.

The act of driving the payout system 120 across suction table 110 enforces tension at web 200 of film 130, between suction table 110 and roll 122. By maintaining tension on the web 200 as the web 200 is unrolled, wrinkle formation is prevented during dispensing of film 130. Specifically, vacuum ports 112 secure the planar portion 220 of web 200 to upper surface 114, which prevents translation of planar portion 220 (i.e., along X, Y, and Z directions) and affixes the planar portion 220 in place. Meanwhile, the moment of inertia of roll 122 (and/or linear elements 128) causes payout system 120 to resist continuing in the movement direction. The moment of inertia of roll 122 may be significant, especially in use cases where roll 122 is sixty pounds, or even heavier. This interplay between the moment of inertia of roll 122 (and/or linear elements 128) and the affixation of planar portion 220 of web 200 results in tension along routed portion 210 of web 200. This provides a benefit because the tension prevents wrinkles from occurring in web 200 as web is dispensed over upper surface 114. Web 200 of film 130 is dispensed evenly because payout system 120 is indexed to suction table 110 in order to make roll 122 and linear elements 128 aligned with upper surface 114 of suction table 110.

In further embodiments, a laminate may be laid-up atop film 130. In such embodiments, method 300 may further comprise halting operation of vacuum ports 112, and transferring the film and the laminate to a new location (e.g., a mandrel used for curing the laminate into a composite part).

Method 300 provides a benefit over prior techniques, such as those that utilize fixed rolls located at one end of a table. Pulling a web from a fixed roll at one end of a table results in less precise placement at portions of the table which are distal from the roll, because the portion of the web that is being dispensed may be many feet away from any element that holds the web in tension. This in turn increases the amount of play in the web, and may cause the web to bunch, crinkle, wrinkle or otherwise be dispensed in an undesirable manner.

Method 300 overcomes these issues by causing payout system 120 to travel with web 200 as film is being dispensed. This means that the distance between payout system 120 and a location on upper surface 114 where film is dispensed remains small (e.g., less than an inch), which in turn reduces play in web 200 and prevents wrinkle formation during the dispensing process. This benefit is particularly notable in scenarios where film 130 is dispensed over long tables (e.g., tables that extend for one hundred feet along X), as the amount of play in fixed systems may become unmanageable, or may require substantially more labor.

Figure 4:
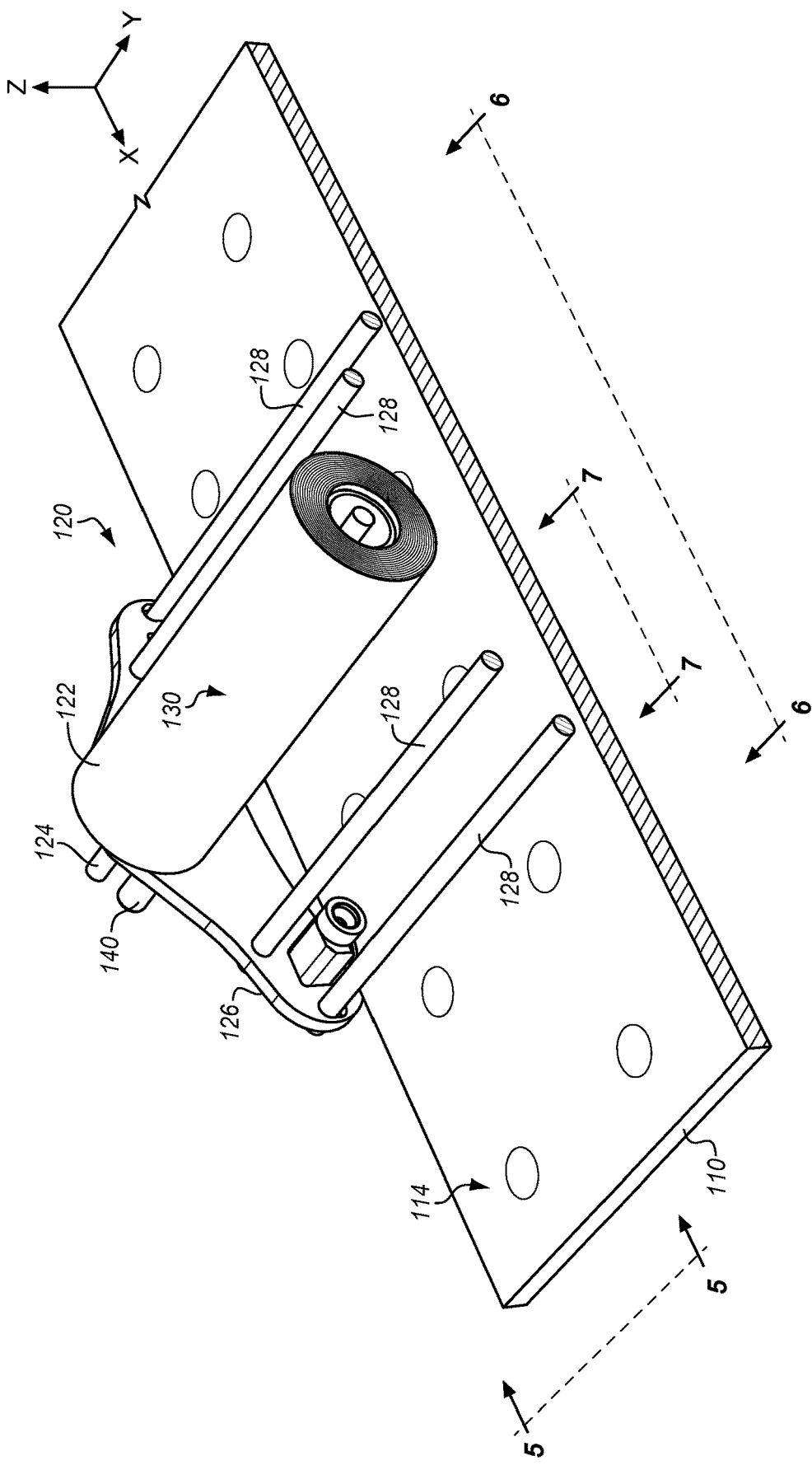
FIG. 4 is a cut-through perspective view of a payout system in an illustrative embodiment.

FIG. 4 is a cut-through perspective view of a payout system 120 in an illustrative embodiment. Specifically, FIG. 4 corresponds with view arrows 4 of FIG. 1. FIG. 4 illustrates linear elements 128 which are obscured in other views, yet provide mechanical support that prevents warping or bending of payout system 120 during operation.

Figure 5:
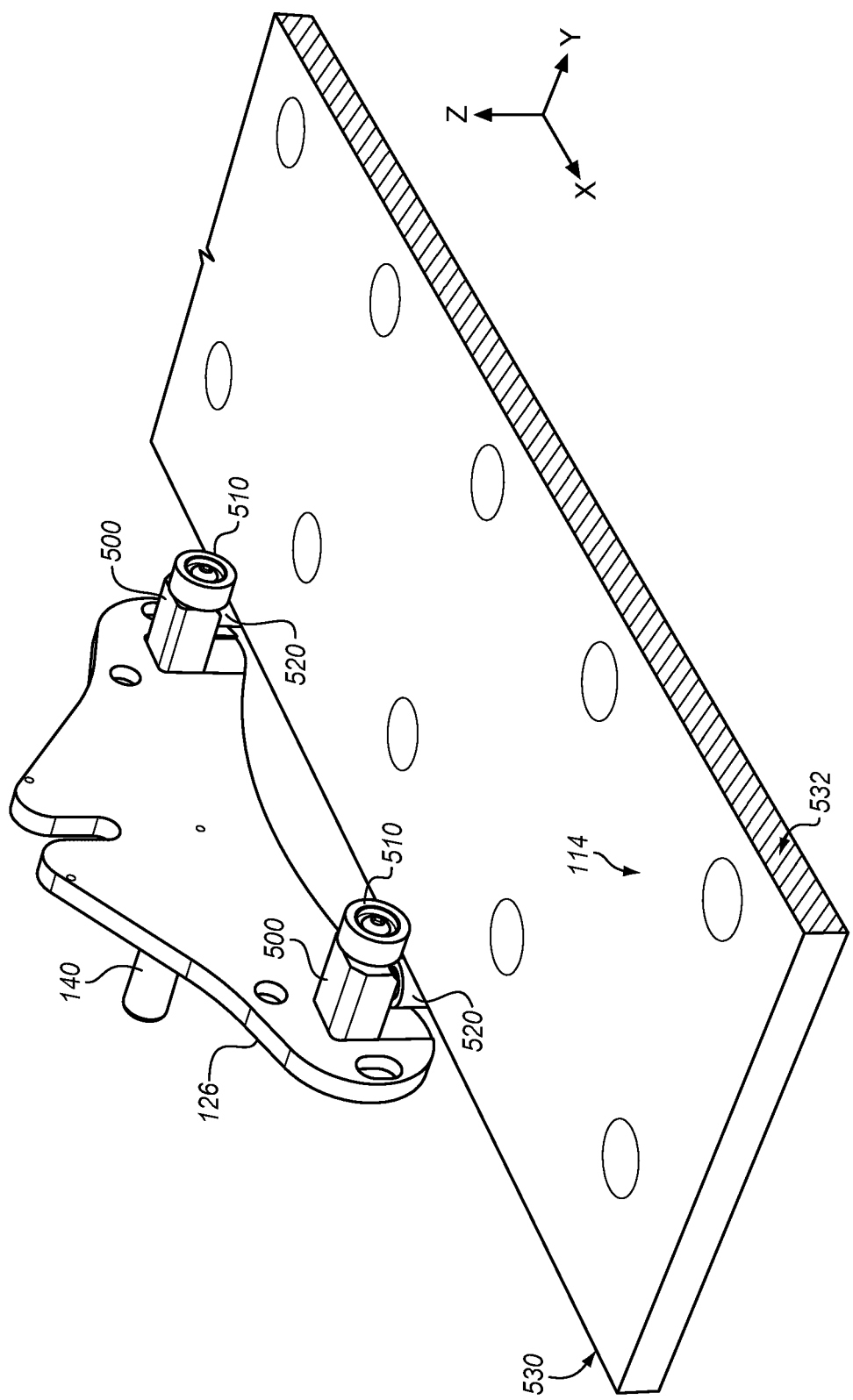
FIG. 5 is a perspective view of wheels attached to a frame element of a payout system in an illustrative embodiment.

FIG. 5 is a perspective view of wheels attached to a frame element 126 of a payout system 120 in an illustrative embodiment. Specifically, FIG. 5 corresponds with view arrows 5 of FIG. 4. According to FIG. 5, projections 500 are attached to frame element 126. Each projection includes wheel 510, and wheel 520. Each wheel 510 rolls/spins/travels across upper surface 114 of suction table 100, while wheels 520 roll/spins/travels along left surface 530, or right surface 532, or suction table 110. These aspects of payout system 120 ensure that payout system 120 remains indexed to suction table 110 as payout system 120 is driven across suction table 110.

In further embodiments, each wheel 510 is accompanied by a sensor (not shown) tracks a distance covered by wheels 510 during payout. Input from the sensors may be used confirm that each end of roll 122 pays out material at the same rate to avoid bunching. Such systems may provide further benefits by confirming a distance of film dispensed from the roll 122. In still further embodiments, motion of the payout system 120 is synchronized with unrolling the web 200 of film 130 from roll 122. For example, wheels 510 may be designed to prevent slip, or a rack and pinion (i.e., a geared) system be substituted for the wheels and the smooth edges of suction table 110. Such a rack and pinion system facilitates embodiments where payout is automated. For example, such systems may be operated by placing a pinion at a left end of the payout system in contact with a rack defining left surface of the suction table, and placing a pinion at a right end of the payout system in contact with a rack defining a right surface of the suction table. Similar embodiments, such as other obvious alternatives, may also be implemented.

Figure 6:
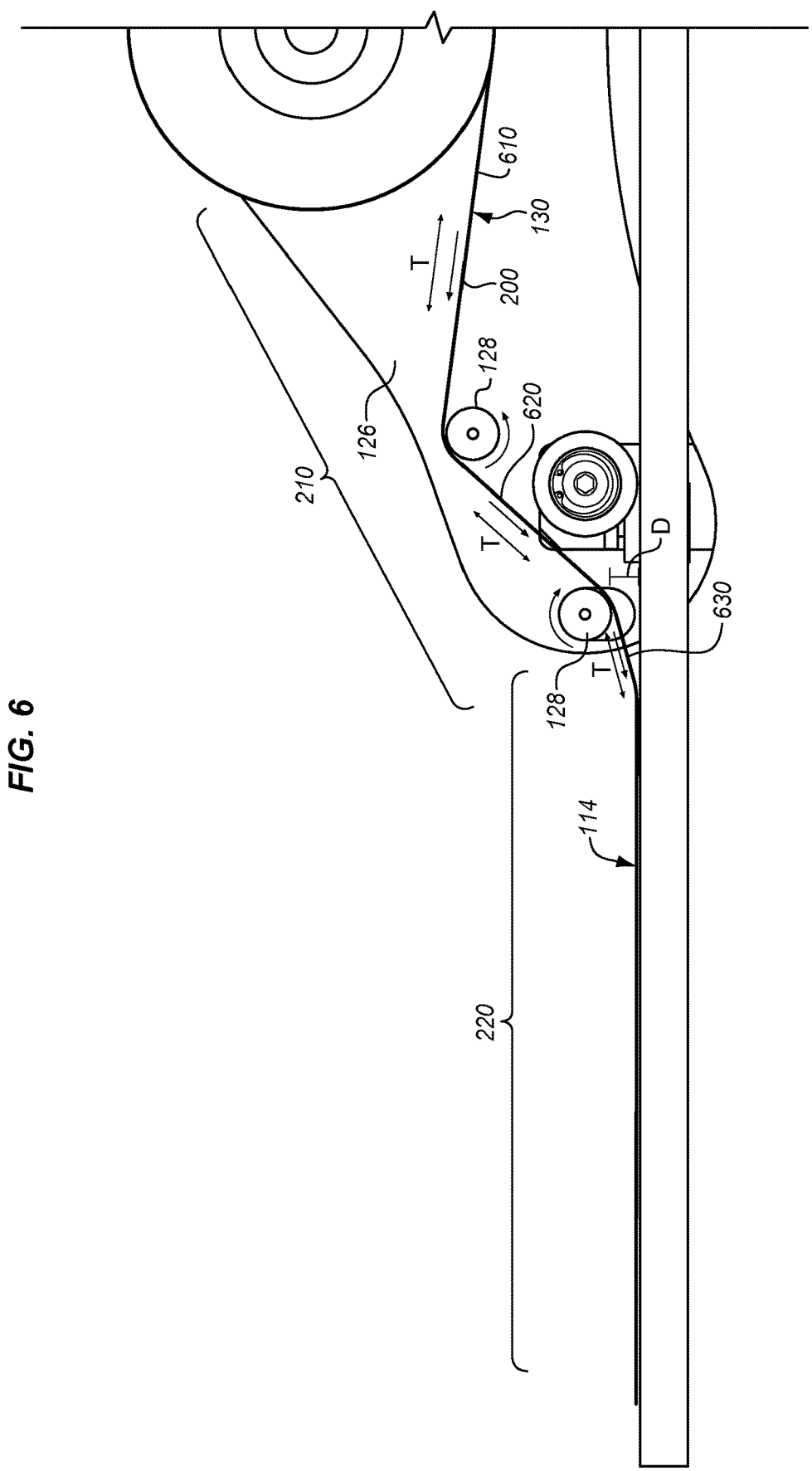
FIG. 6 is a cut-through side view of a payout system dispensing a web of film onto a suction table in an illustrative embodiment.

FIG. 6 is a cut-through side view of a payout system dispensing a web of film onto a suction table in an illustrative embodiment, and corresponds with view arrows 6 of FIG. 4. FIG. 6 illustrates that routed portion 210 of web 200 includes segment 610, segment 620, and segment 630. Each segment is held in tension by two separate components. Specifically, segment 610 is held in tension (T) by roll 122 (of FIG. 1) and by a linear element 128. Segment 620 is held in tension by two of linear elements 128, and segment 630 is held in tension by a linear element 128 and by vacuum affixation to upper surface 114 of suction table 110. To provide wrinkle free application of film 130 from roll 122 to suction table 110, the linear element 128 closest to upper surface 114 may be disposed a distance (D) of less than one hundred thousandths of an inch (e.g., fifty thousandths of an inch) above upper surface 114. This distance may be designed to be close enough to ensure tension at segment 630, while far enough to prevent binding between the linear element 128 and upper surface 114.

In further embodiments, a sensor measures distance traveled by payout system 120, and determines a linear amount of film 130 dispensed based on this measured distance. A control system accessing input from the sensor may control automatic dispensing and cutting based on these measured distances. Hence, a method of operating the payout system 120 may include receiving input from the sensor (in the form of measured distance) as the payout system is driven across the suction table.

Figure 7:
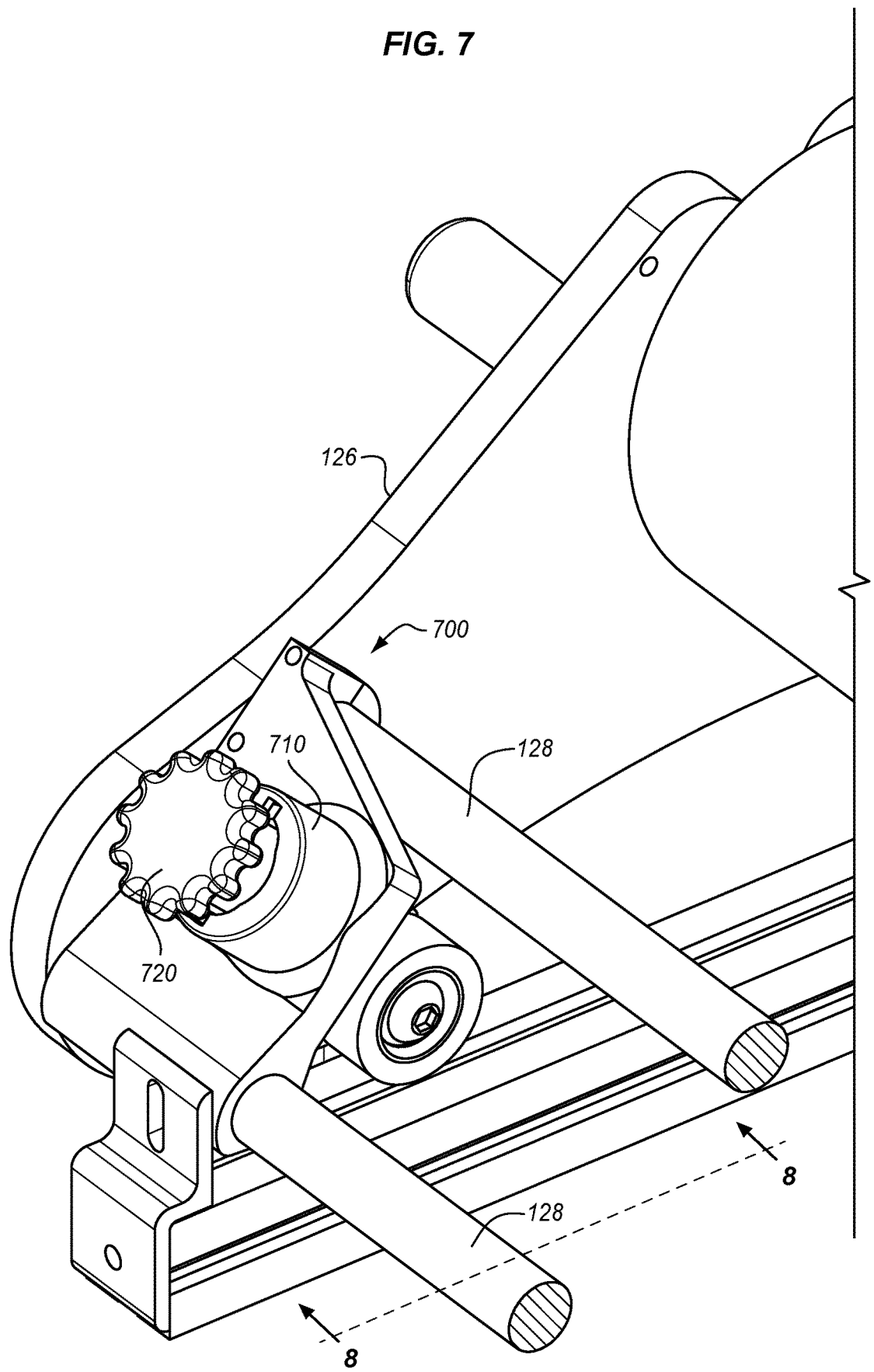
FIG. 7 is a perspective view of a cutter mount for a payout system in an illustrative embodiment.
Figure 8:
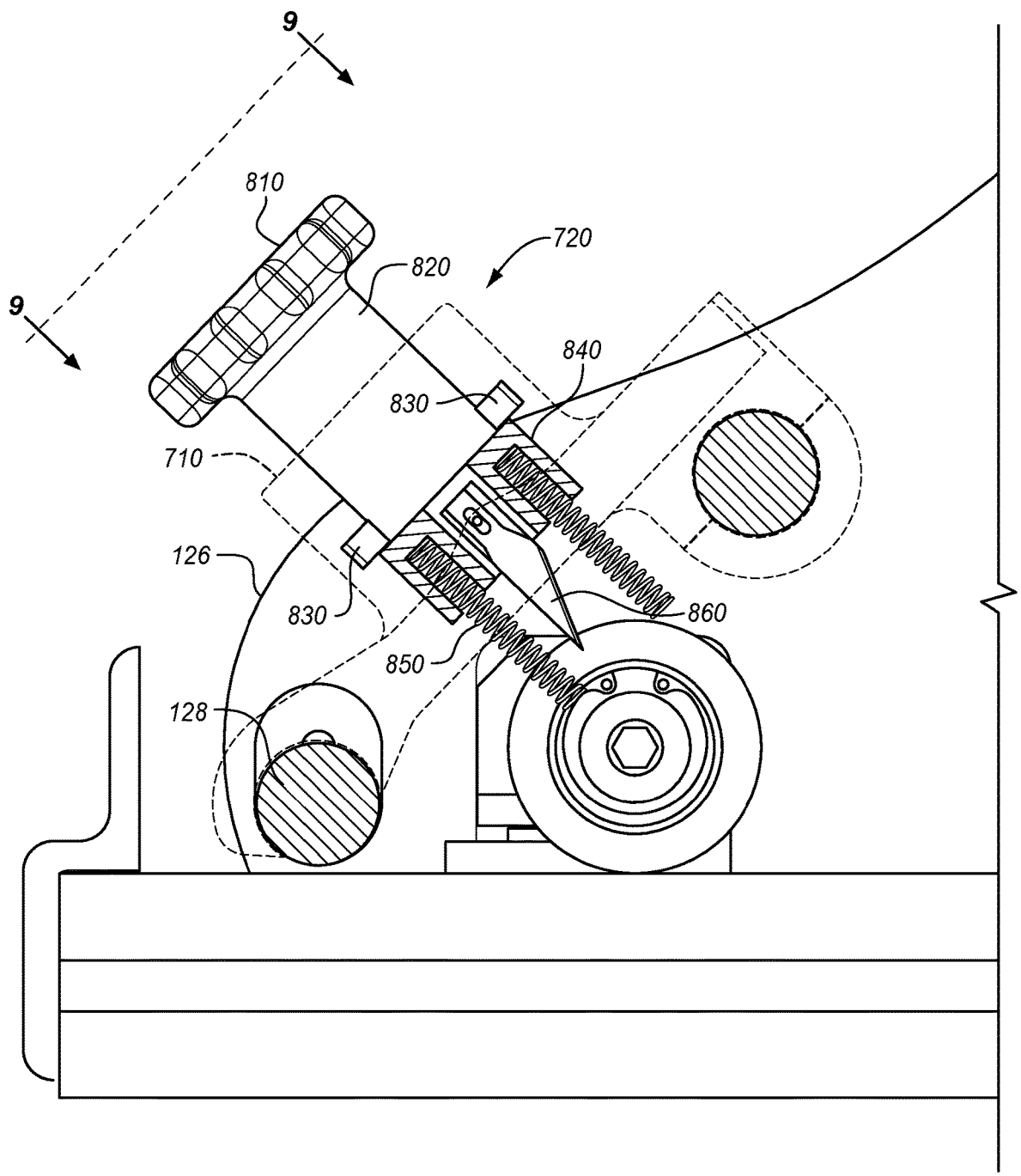
FIG. 8 is a side view of a blade cartridge for a cutter mount in an illustrative embodiment.
Figure 9:
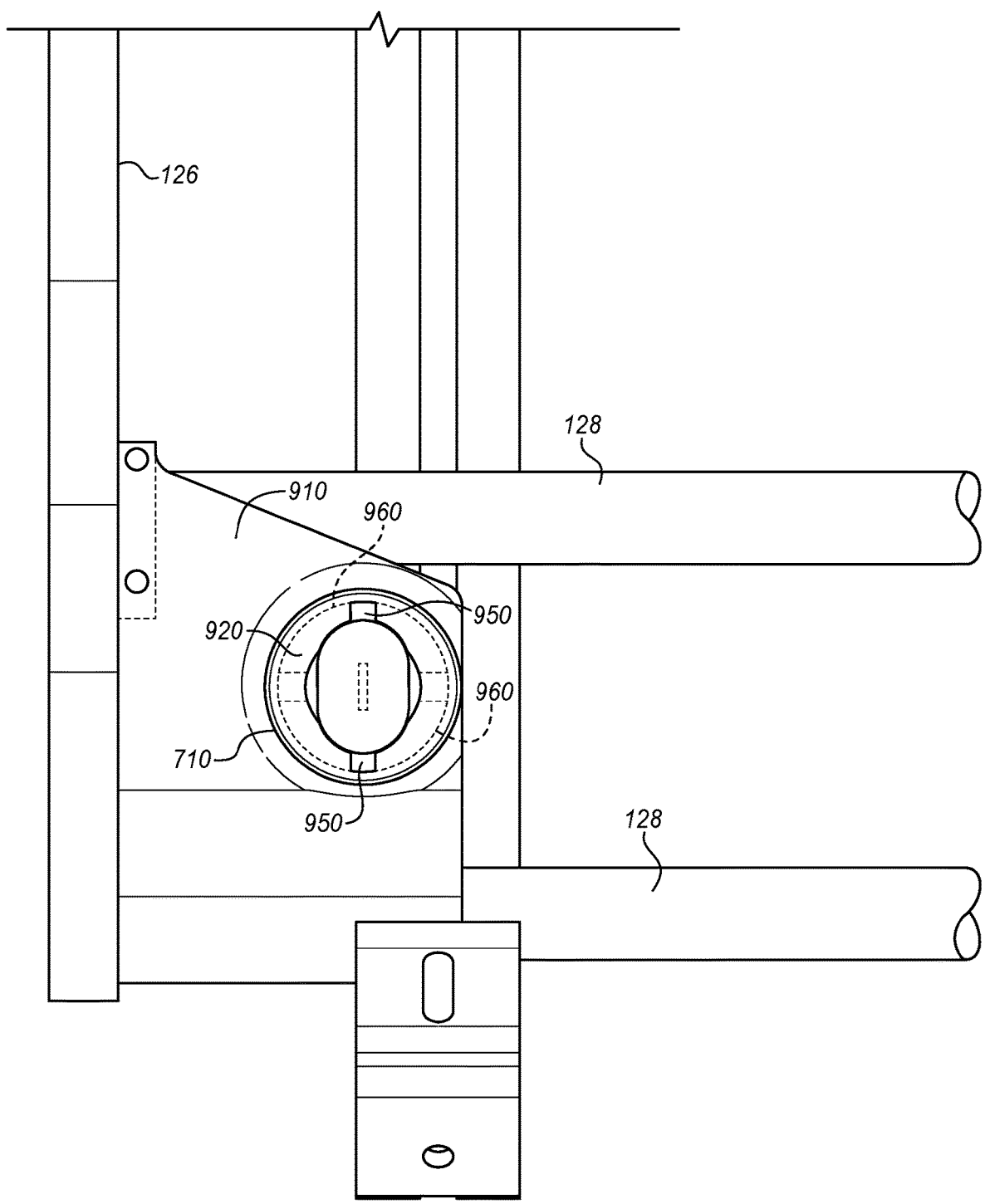
FIG. 9 is a face-on view of a cutter mount in an illustrative embodiment.

In addition to dispensing the film 130, in further embodiments the payout system 120 may cut film 130 as film 130 is dispensed, in order to dimension film 130 to a width of suction table 110 (along Y). FIGS. 7-9 depict a cutting device that may be used to cut film 130 in an illustrative embodiment. For example, in embodiments where roll 122 extends further in the Y direction than upper surface 114, the cutting device may include a blade that continuously cuts the film 130 to a width of suction table 110 while payout system 120 is being driven across the suction table 110. This causes the action of pushing the payout system to perform both dispensing and cutting, which saves labor. Cutting devices may be disposed on either or both sides of payout system 120 as desired.

FIG. 7 is a perspective view of a cutting device 700 for a payout system that cuts film 130 in an illustrative embodiment. According to FIG. 7, cutting device 700 includes cutter mount 710, which is affixed to multiple linear elements 128 and receives blade cartridge 720. FIG. 8 is a side view of a blade cartridge 720 for a cutter mount 710 in an illustrative embodiment. FIG. 8 corresponds with view arrows 8 of FIG. 7. However, cutter mount 710 has been removed in order to better illustrate blade cartridge 720. According to FIG. 8, blade cartridge 720 includes ergonomic grip 810, which is coupled with shaft 820. Shaft 820 includes projections 830 which help to lock blade cartridge 720 in place. Blade cartridge 720 also includes housing 840, which holds retention springs 850 and blade 860 in place.

FIG. 9 is a face-on view of a cutter mount 710 in an illustrative embodiment, and corresponds with view arrows 9 of FIG. 8. According to FIG. 9, cutter mount 710 includes housing 910 which mates to linear elements 128, and also includes hollow cylinder 920 which projects from housing 910. Hollow cylinder 920 includes receptacles 950 which receive projections 830 of blade cartridge 720. Receptacles 950 define an entrance to tunnels 960 within hollow cylinder 920. By pressing blade cartridge 720 into cutter mount 710 while receptacles 950 are aligned with projections 830, and then twisting blade cartridge 720 to move projections 830 into tunnels 960, blade cartridge 720 may be secured.

Similar cutter mounts to those described above may be utilized to facilitate not just cutting along the width of roll 122, but also cut along the length of roll 122 (i.e., cuts along the Y axis, in addition to cuts along the X axis). In one embodiment, such cutter mounts slide along the width of payout system 120 in order to cut web 200 to a desired length.

Figure 10:
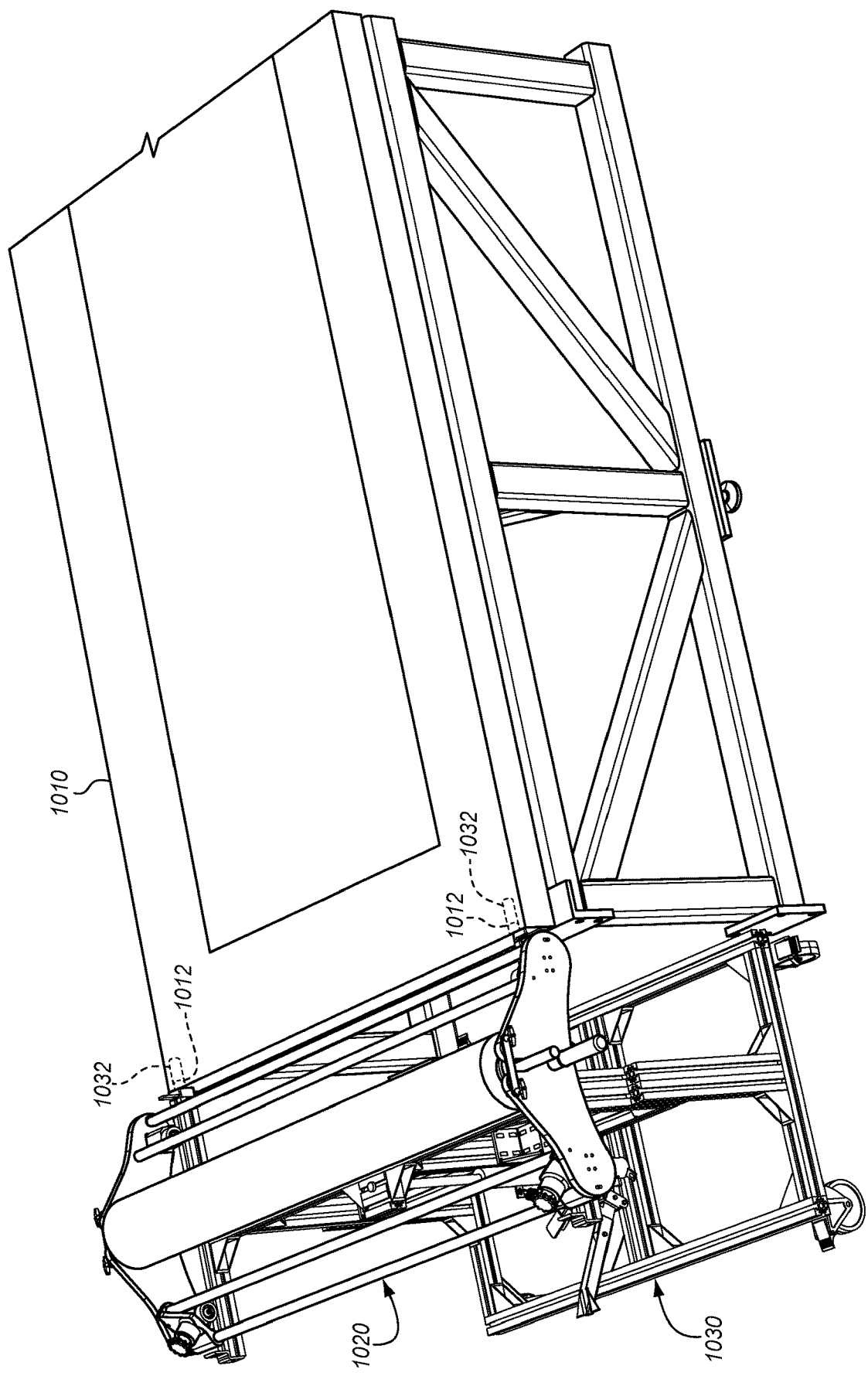
FIG. 10 is a perspective view of a cart that carries a payout system and has been indexed to a suction table in an illustrative embodiment.
Figure 11:
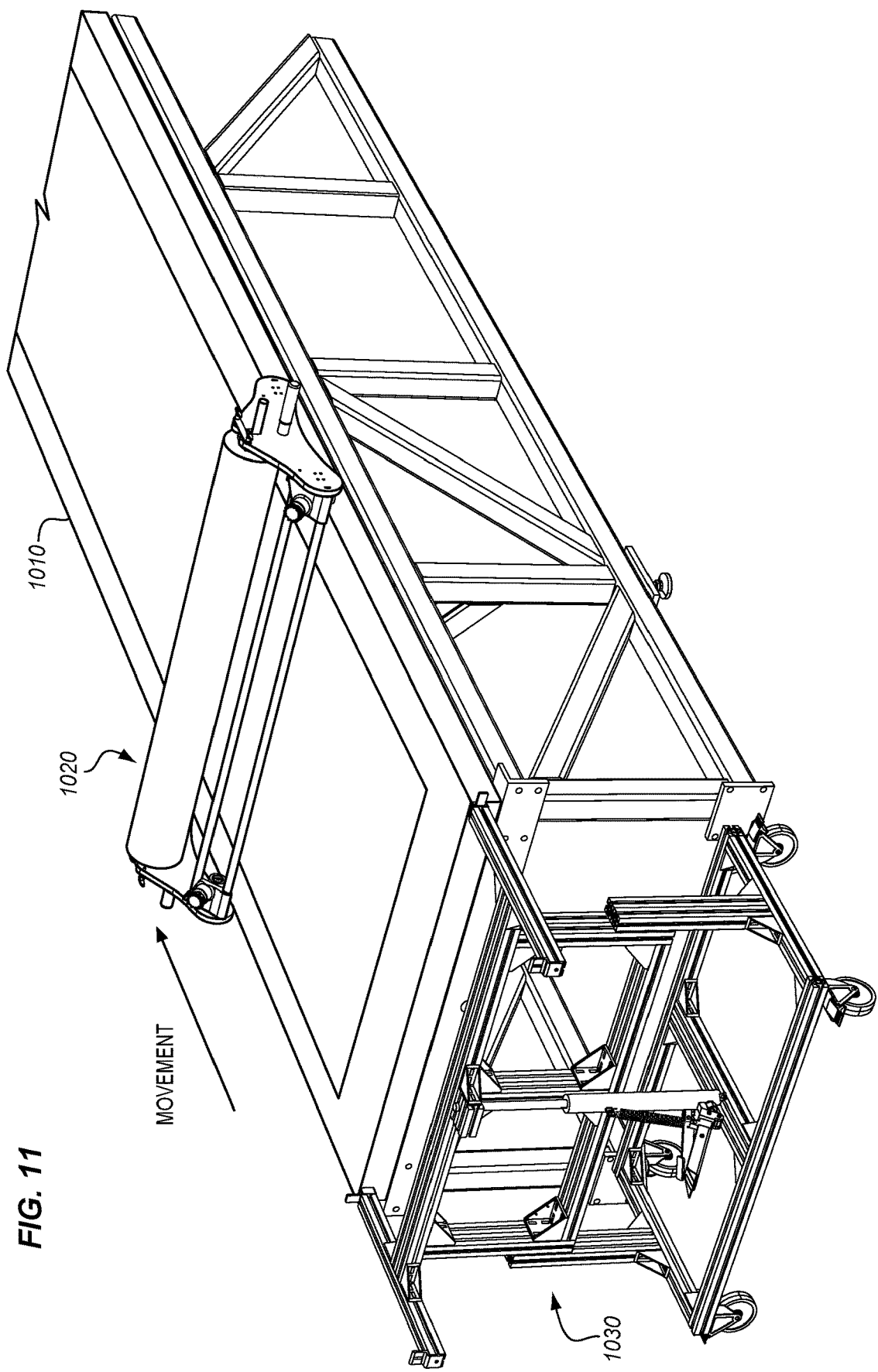
FIG. 11 is a perspective view of a payout system traversing from a cart onto a suction table in an illustrative embodiment.

With various features of payout system 120 discussed above, further description shall be focused upon transporting payout system 120 to suction table 110. For example, FIGS. 10-11 illustrate transfer of a payout system from a cart to a suction table in an illustrative embodiment. FIG. 10 is a perspective view of a cart 1030 that carries a payout system 1020 and has been indexed to a suction table 1010 in an illustrative embodiment. According to FIG. 10, a mating feature 1032 (e.g., a pin) at cart 1030 has been aligned with a mating feature 1012 (e.g., a recess) at suction table 1010. Cart 1030 has been pushed until the pin enters the recess, which ensures that cart 1030 has been properly indexed to suction table 1010.

FIG. 11 is a perspective view of a payout system 1020 traversing from a cart 1030 onto a suction table 1010 in an illustrative embodiment. In FIG. 11, wheels at payout system 1020 have been aligned with one or more surfaces at suction table 1010, and payout system 1010 has been driven from cart 1030 directly across suction table 1010. Hence, cart 1030 may be removed and film may be dispensed from payout system 1020 as desired.

Figure 12:
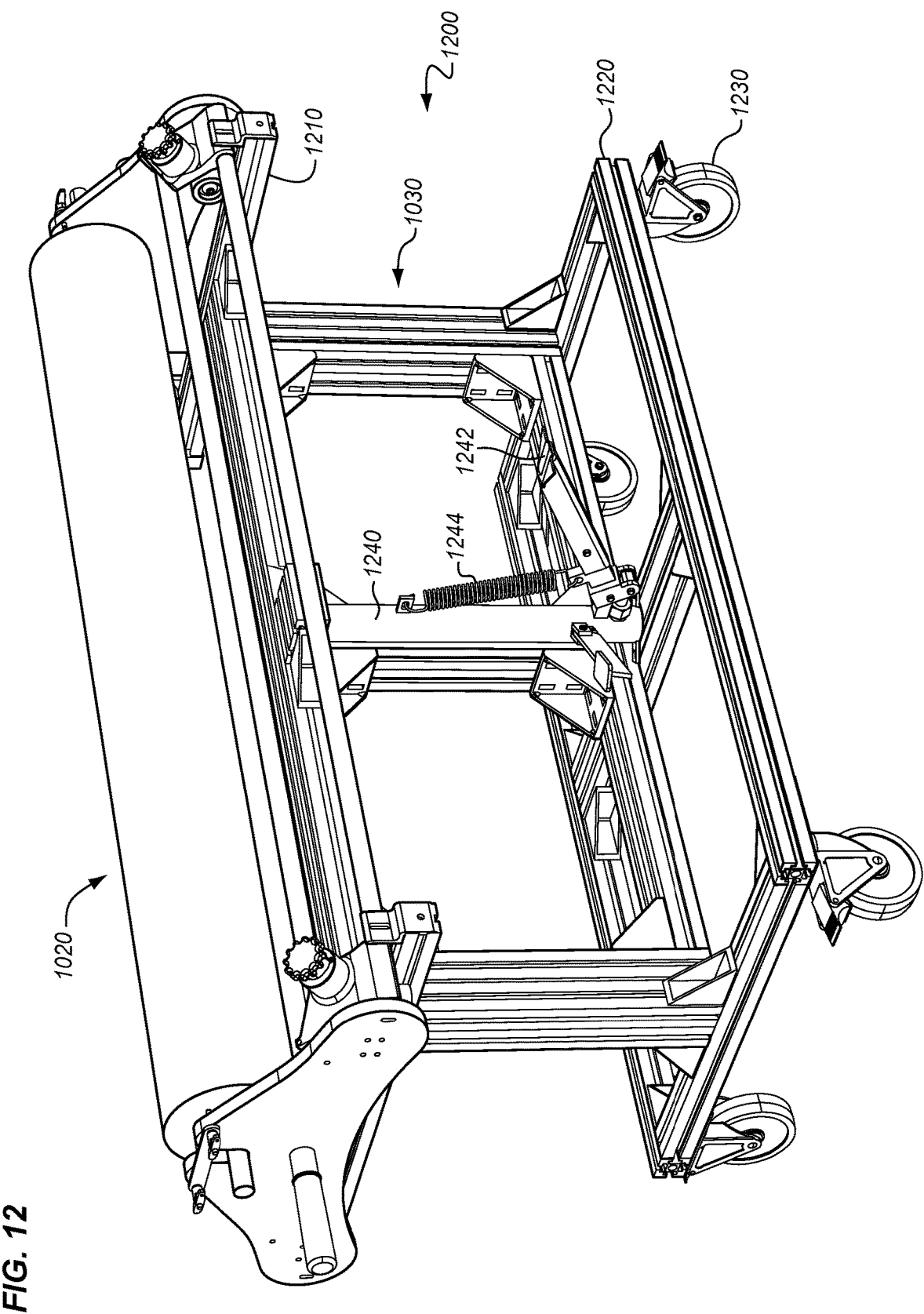
FIG. 12 is a perspective view of a cart in a reloading position in an illustrative embodiment.
Figure 13:
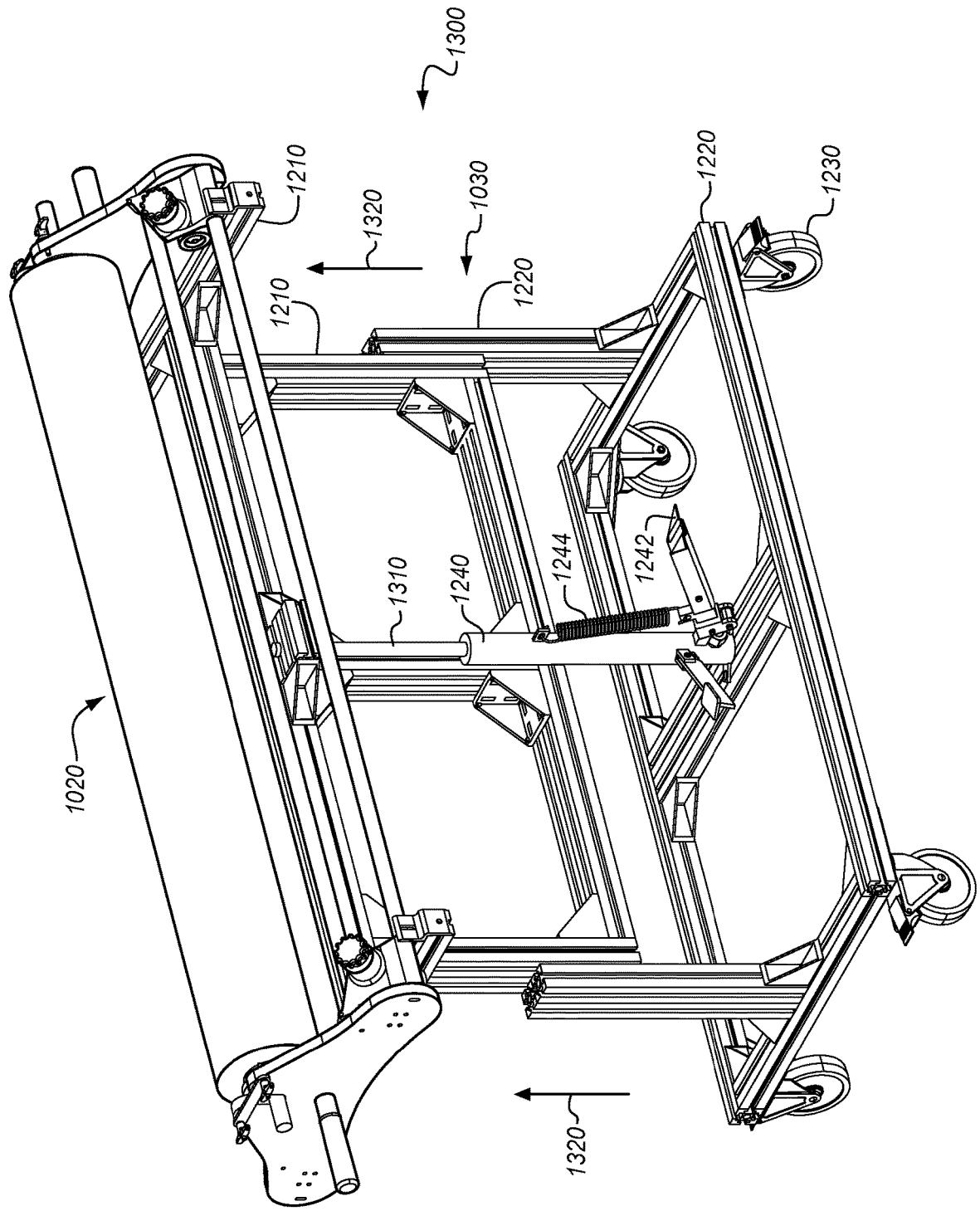
FIG. 13 is a perspective view of a cart in a transfer position in an illustrative embodiment.

FIGS. 12-13 illustrate how cart 1030 may be raised (e.g., to vertically align payout system 1020 with an upper surface of suction table 1010) and lowered (e.g., to facilitate loading of a new roll onto payout system 1020). Specifically, FIG. 12 is a perspective view of a cart 1030 in a reloading position 1200 in an illustrative embodiment. FIG. 12 illustrates that cart 1030 includes an upper frame 1210, and a lower frame 1220. While in reloading position 1200 and upper frame 1210 has been actuated downwards, an operator may load a roll 122 of film 130.

Actuator 1240 controls a distance between upper frame 1210 and lower frame 1220. For example, by operating jack 1242, actuator 1240 may actuate upper frame 1210 upward or downward. Biasing device 1244 (e.g., a spring) maintains jack 1242 in a desired position, and wheels 1230 enable cart 1030 to be moved across a factory floor as desired.

FIG. 13 is a perspective view of a cart 1030 in a transfer position 1300 in an illustrative embodiment. According to FIG. 13, upper frame 1210 has been displaced from lower frame 1220 along the direction indicated by arrows 1320. Furthermore, piston 1310 of actuator 1240 is exposed.

Figure 14:
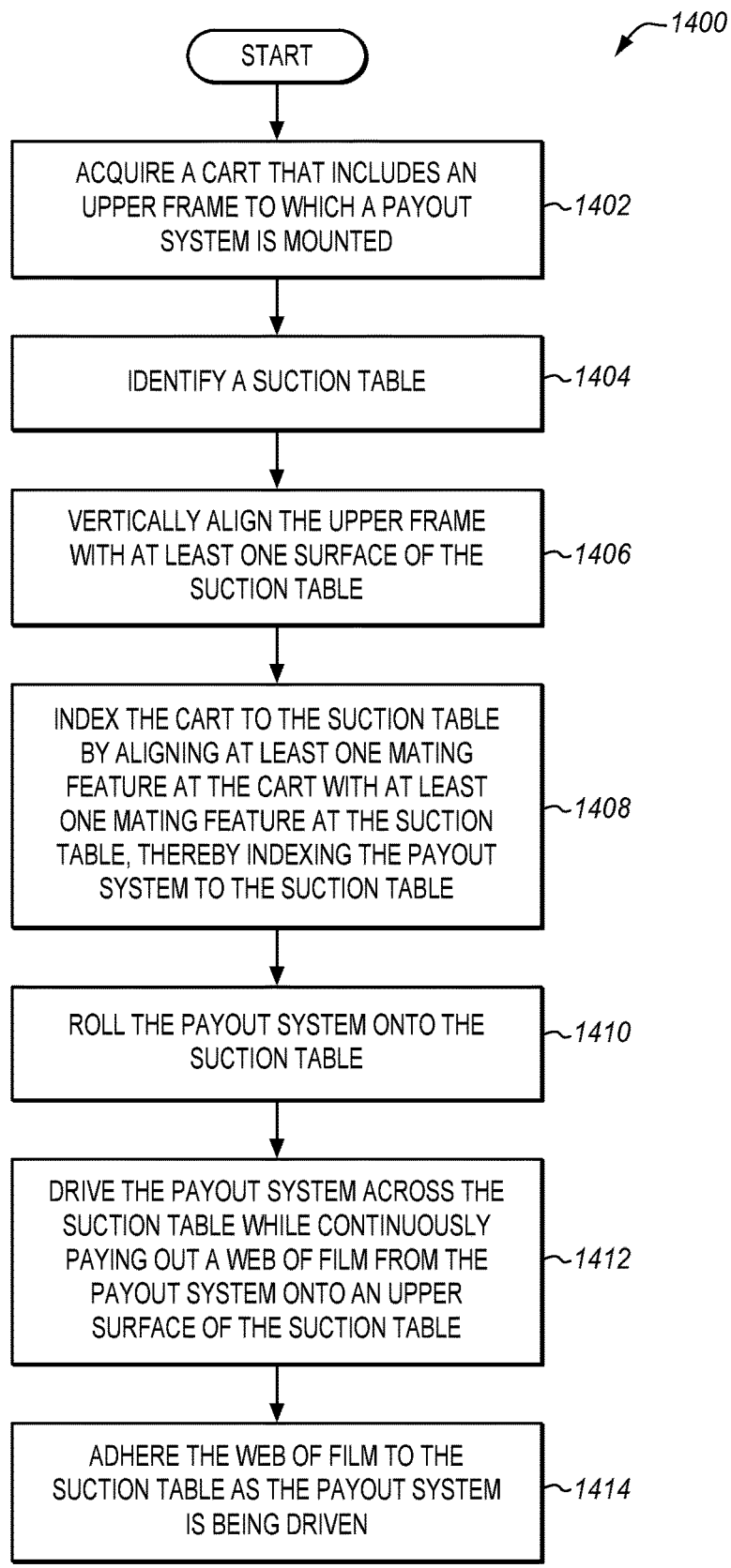
FIG. 14 is a flowchart of a method for transferring a payout system from a cart to a suction table in an illustrative embodiment.

FIG. 14 is a flowchart of a method 1400 for transferring a payout system from a cart to a suction table in an illustrative embodiment. Method 1400 includes acquiring a cart 1030 that includes an upper frame 1210 to which a payout system 1020 is mounted (step 1402). Method 1400 also includes identifying a suction table, such as suction table 1010 (step 1404). With a suction table identified, method 1400 further includes vertically aligning the upper frame 1210 with at least one surface of the suction table 1010 (step 1406). For example, this may comprise actuating the upper frame 1210 upwards until wheels of the payout system 1020 are aligned with at least one surface of the suction table (e.g., an upper surface, a leftward surface and a rightward surface, etc.).

In step 1408, cart 1030 is indexed to suction table 1010 by aligning at least one mating feature at the cart 1030 with at least one mating feature at the suction table 1010 (e.g., by aligning a pin at cart 1030 with a recess at suction table 1010, and pushing cart 1030 towards suction table 1010). This operation indexes the payout system 1020 to the suction table 1010.

With cart 1030 indexed to suction table 1010, method 1400 further includes rolling the payout system 1020 onto suction table 1010 (step 1410). This may be performed, for example, by unlocking payout system 1020 from cart 1030, and directly rolling cart 1030 in the direction shown in FIG. 12.

Method 1400 may further include driving the payout system 1020 across the suction table 1010 while continuously paying out a web of film from the payout system onto an upper surface of the suction table 1010 (step 1412), and adhering film 130 to upper surface 114 of suction table 110 (step 1414). (This may be performed, for example, in the same manner as discussed in the flowchart of FIG. 3.

Figure 15:
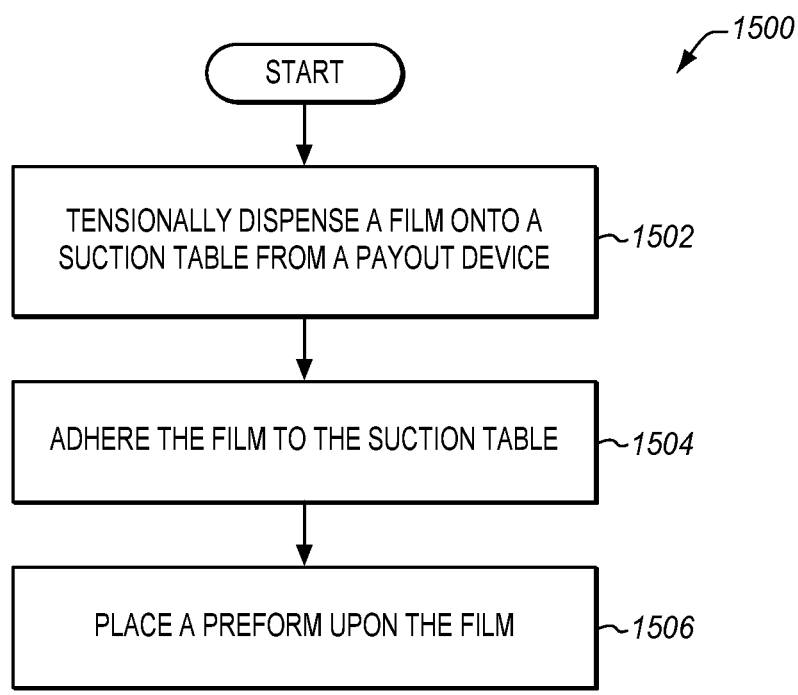
FIG. 15 is a flowchart illustrating a method for composite part fabrication in an illustrative embodiment.

FIG. 15 is a flowchart illustrating a method 1500 for composite part fabrication in an illustrative embodiment. Method 1500 includes tensionally dispensing a film 130 onto a suction table 110 from a payout system 120 (step 1502). Method 1500 further includes adhering the film 130 to the suction table 110 (e.g., via suction from vacuum ports 112) (step 1504). Additionally, method 1500 includes placing a preform upon the film 130 (step 1506). The preform (i.e., an uncured laminate) may be placed in whole upon the film 130, or may be laid-up onto film 130. In further embodiments, the film 130 and the preform may be transported from the suction table after removing adhesion of the film to the suction table (e.g., by turning off vacuum ports 112).

EXAMPLES

In the following examples, additional processes, systems, and methods are described in the context of a system that dispenses a web of film for a suction table.

Figure 16:
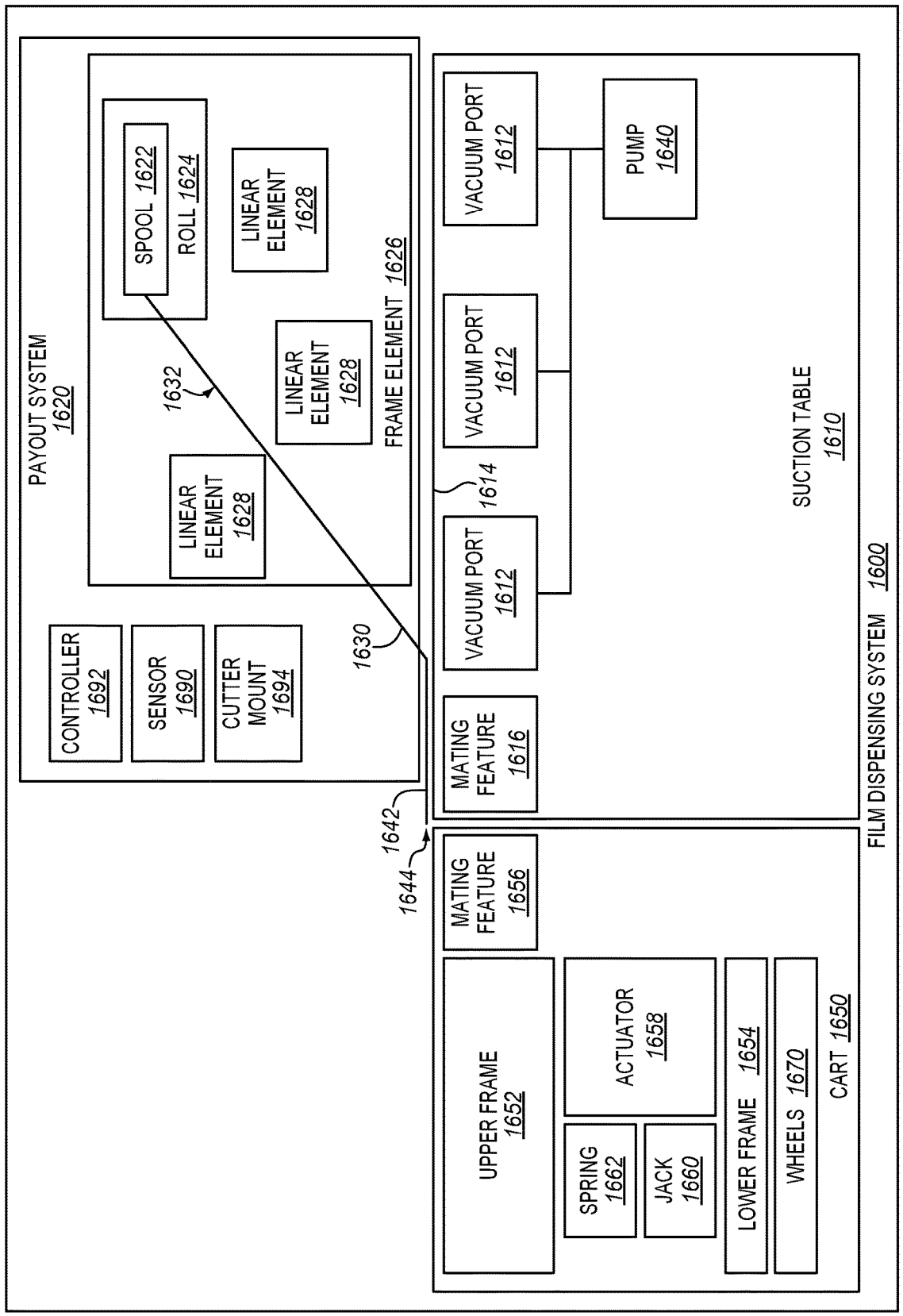
FIG. 16 is a block diagram of a film dispensing system in an illustrative embodiment.

FIG. 16 is a block diagram of a film dispensing system 1600 in an illustrative embodiment. According to FIG. 16, film dispensing system 1600 includes three major components: a suction table 1610, a payout system 1620, and a cart 1650. Suction table 1610 includes an upper surface 1614, and multiple vacuum ports 1612 that draw air from upper surface 1614. Vacuum ports 1612 are driven by pump 1640. Suction table 1610 also includes a mating feature 1616 (e.g., a pin, a recess, etc.). Mating feature 1616 will mate with mating feature 1656 of cart 1650.

Cart 1650 includes mating feature 1656 (e.g., a complementary pin, recess, etc.) for indexing cart 1650 to suction table 1610. Cart 1650 also includes lower frame 1654, which is attached to wheels 1670 and actuator 1658. Actuator 1658 (e.g., a linear actuator) is also attached to upper frame 1652, and is capable of vertically displacing the upper frame 1652. Jack 1660 controls the actuation of actuator 1658, and spring 1662 biases jack 1660 to a desired position.

Payout system 1620 dispenses a web 1630 of film 1632 onto upper surface 1614 of suction table 1610, forming planar portion 1642 including a leading edge 1644 which is held in place by vacuum ports 1612. Payout system 1620 includes frame elements 1626, which are attached to linear elements 1628 as well as spool 1622 and roll 1624.

A sensor 1690 (e.g., a Lidar, laser, rotational sensor, acoustic sensor, etc.). may measure distance traveled by payout system 1620, and a controller 1692 may direct the operations of one or more cutter mounts 1694 based on input from sensor 1690. These elements may facilitate automatic dispensing of film 1632 (e.g., in embodiments where roll 1624 is motorized).

Figure 17:
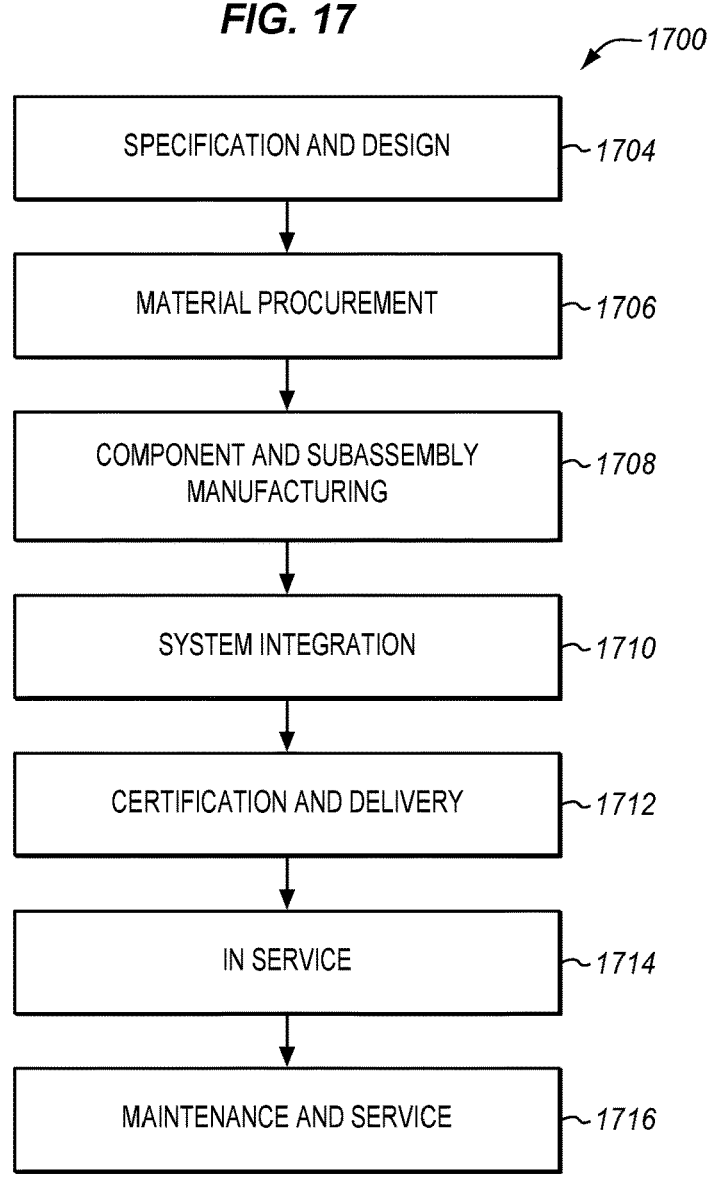
FIG. 17 is a flow diagram of aircraft production and service methodology in an illustrative embodiment.
Figure 18:
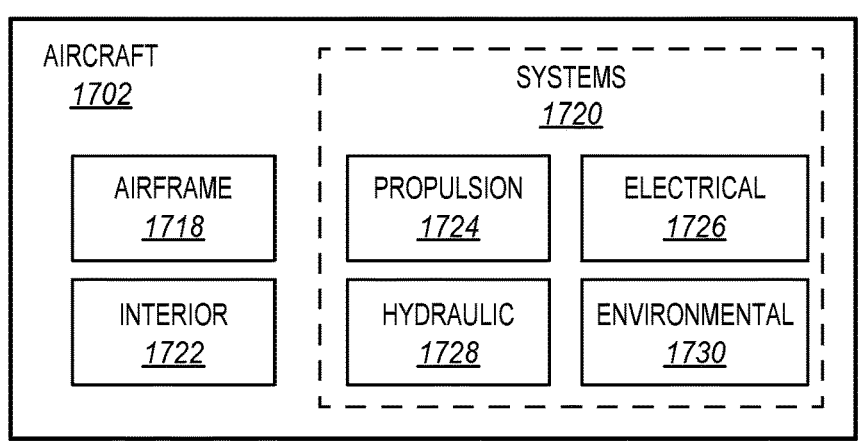
FIG. 18 is a block diagram of an aircraft in an illustrative embodiment.

Referring more particularly to the drawings, embodiments of the disclosure may be described in the context of aircraft manufacturing and service in method 1700 as shown in FIG. 17 and an aircraft 1702 as shown in FIG. 18. During pre-production, method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine work in maintenance and service 1716 (which may also include modification, reconfiguration, refurbishment, and so on). Apparatus and methods embodied herein may be employed during any one or more suitable stages of the production and service described in method 1700 (e.g., specification and design 1704, material procurement 1706, component and subassembly manufacturing 1708, system integration 1710, certification and delivery 1712, service 1714, maintenance and service 1716) and/or any suitable component of aircraft 1702 (e.g., airframe 1718, systems 1720, interior 1722, propulsion system 1724, electrical system 1726, hydraulic system 1728, environmental 1730).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by method 1700 may include an airframe 1718 with a plurality of systems 1720 and an interior 1722. Examples of systems 1720 include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1700. For example, components or subassemblies corresponding to component and subassembly manufacturing 1708 may be fabricated or manufactured in a manner similar to components or subassemblies produced while the aircraft 1702 is in service. Also, one or more apparatus embodiments, method embodiments, or a combination thereof may be utilized during the subassembly manufacturing 1708 and system integration 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation during the maintenance and service 1716. For example, the techniques and systems described herein may be used for material procurement 1706, component and subassembly manufacturing 1708, system integration 1710, service 1714, and/or maintenance and service 1716, and/or may be used for airframe 1718 and/or interior 1722. These techniques and systems may even be utilized for systems 1720, including, for example, propulsion system 1724, electrical system 1726, hydraulic 1728, and/or environmental system 1730.

In one embodiment, a part comprises a portion of airframe 1718, and is manufactured during component and subassembly manufacturing 1708. The part may then be assembled into an aircraft in system integration 1710, and then be utilized in service 1714 until wear renders the part unusable. Then, in maintenance and service 1716, the part may be discarded and replaced with a newly manufactured part. Inventive components and methods may be utilized throughout component and subassembly manufacturing 1708 in order to facilitate the manufacture of new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for dispensing film onto a surface, the method comprising:
operating vacuum ports at a suction table;
adhering a leading edge of a web of film to the suction table;
driving a payout system across the suction table while the vacuum ports are being operated and while unrolling the web of film;
unrolling a web of film from a roll of a payout system that is mounted for traversal across an upper surface of the suction table;
enforcing tension at the web of film between the suction table and the roll while payout system is drawn across the suction table;
inserting projections of a blade cartridge into receptacles of a cutter mount that is affixed to the payout system;

rotating the projections of the blade cartridge into tunnels of the cutter mount and cutting the web of film while unrolling the web, via the blade cartridge.

2. The method of claim 1 further comprising:

continuously cutting the film to a width of the suction table while the payout system is being driven across the suction table and while the web of film is unrolling.

3. The method of claim 1 further comprising:

taping an end of the film to the suction table prior to drawing the payout system across the suction table.

4. The method of claim 1 further comprising:

placing wheels at a first end of the payout system in contact with a first surface of the suction table, and placing wheels at a second end of the payout system in contact with a second surface of the suction table.

5. The method of claim 1 further comprising:

placing a pinion at a first end of the payout system in contact with a rack defining a first surface of the suction table, and placing a pinion at a second end of the payout system in contact with a rack defining a second surface of the suction table.

6. The method of claim 1 further comprising:

removing the blade cartridge by operating an ergonomic grip of the blade cartridge.

7. The method of claim 6 further comprising:

inserting a new blade cartridge into the cutter mount.

8. The method of claim 7 wherein:

inserting the new blade cartridge comprises pressing the new blade cartridge into the cutter mount and twisting the new blade cartridge.

9. A portion of an aircraft assembled according to the method of claim 1.

10. A method for aligning a cart and transferring a payout system to a table, the method comprising:

vertically aligning an upper frame of a cart with at least one surface of a suction table;

indexing the payout system to the suction table;

rolling the payout system from the cart onto the suction table;

driving the payout system across the suction table while continuously paying out a web of film from the payout system onto an upper surface of the suction table; and adhering the web of film to the upper surface as the payout system is being driven.

11. The method of claim 10 further comprising: separating the payout system from the upper frame of the cart.

12. The method of claim 10 wherein:

vertically aligning the upper frame comprises actuating the upper frame upwards.

13. The method of claim 10 wherein:

indexing the payout system comprises indexing the cart to the suction table by aligning at least one mating feature at the cart with at least one mating feature at the suction table.

14. The method of claim 13 wherein:

the at least one mating feature of the cart comprises a pin protruding from the cart, the at least one mating feature of the suction table comprises a recess in the suction table, and the method further comprises pushing the cart until the pin enters the recess.

15. The method of claim 9 further comprising: placing a pinion at a left end of the payout system in contact with a rack defining a left surface of the suction table, and placing a pinion at a right end of the payout system in contact with a rack defining a right surface of the suction table.

16. A portion of an aircraft assembled according to the method of claim 10.

17. A system for dispensing film onto a table, the system comprising:

a suction table comprising:

an upper surface; and vacuum ports which draw air from the upper surface; and a payout system comprising:

a spool configured to dispense film from a roll;

frame elements that are disposed at sides of the spool and are separated by at least a width of the upper surface and provide mechanical integrity for the payout system;

linear elements that structurally unite the frame elements together;

wheels that are configured to roll the payout system along at least one surface of the suction table while the roll dispenses film; and a cutter mount which removably retains a blade cartridge that comprises retention springs and a blade that cuts the film while the film is being dispensed, wherein the cutter mount defines receptacles that receive projections of the blade cartridge, and further defines tunnels that are dimensioned to receive the projections when the blade cartridge is rotated after the receptacles receive the projections.

18. The system of claim 17 wherein:

a ratio of a width of the payout system to a length of the payout system is between two to one and four to one.

19. The system of claim 17 wherein:

the roll extends further than a width of the suction table; and the payout system further comprises blades which cut the film to a width of the suction table as the film is dispensed from the roll.

20. The system of claim 17 wherein:

the cutter mount is fixedly attached to one of the linear elements.

21. The system of claim 17 wherein:

at least one of the linear elements is disposed less than one hundred thousandths of an inch above the upper surface.

22. The system of claim 17 wherein:

the payout system further comprises wheels which travel along a surface of the suction table.

23. Fabricating a portion of an aircraft using the system of claim 17.

24. The system of claim 17 wherein:

the blade cartridge includes a housing that holds the blade in place.

25. The system of claim 17 wherein:

the blade cartridge includes an ergonomic grip.

26. The system of claim 17 wherein:

the blade cartridge includes a housing that holds the retention springs in place.

27. The system of claim 17 wherein:

the cutter mount slides along a width of the payout system in order to cut the film to a desired length.

* * * * *